May 17, 1960 D. MULLAN ET AL 2,936,797
HIGH SPEED INCANDESCENT LAMP ASSEMBLING MACHINE
Filed Aug. 12, 1954 9 Sheets-Sheet 1
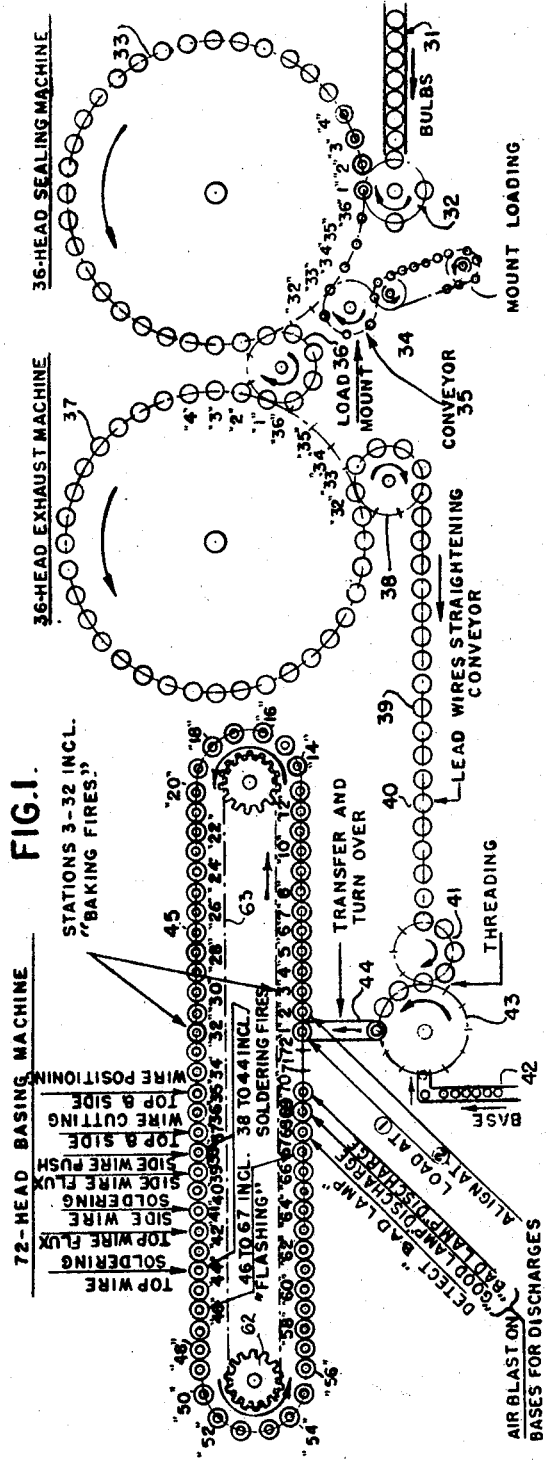
INVENTORS
DANIEL MULLAN,
EDWARD ZILAHY.
BY
ATTORNEY.

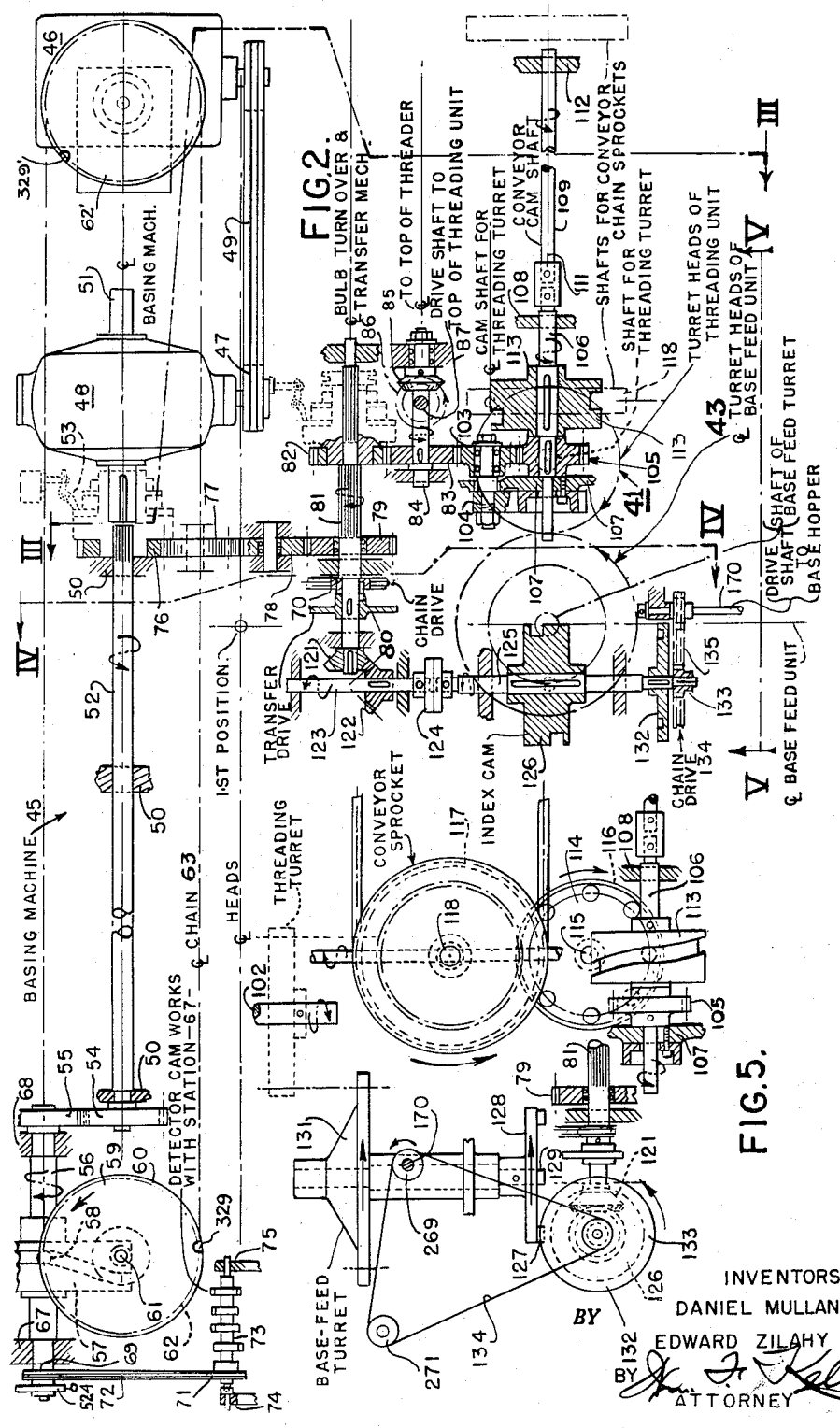

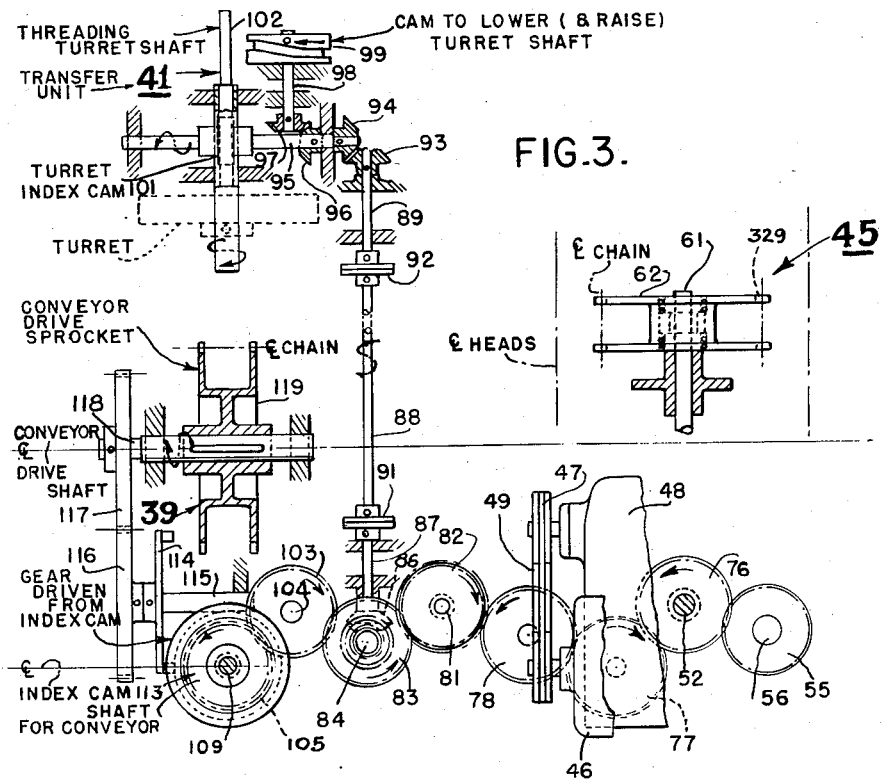
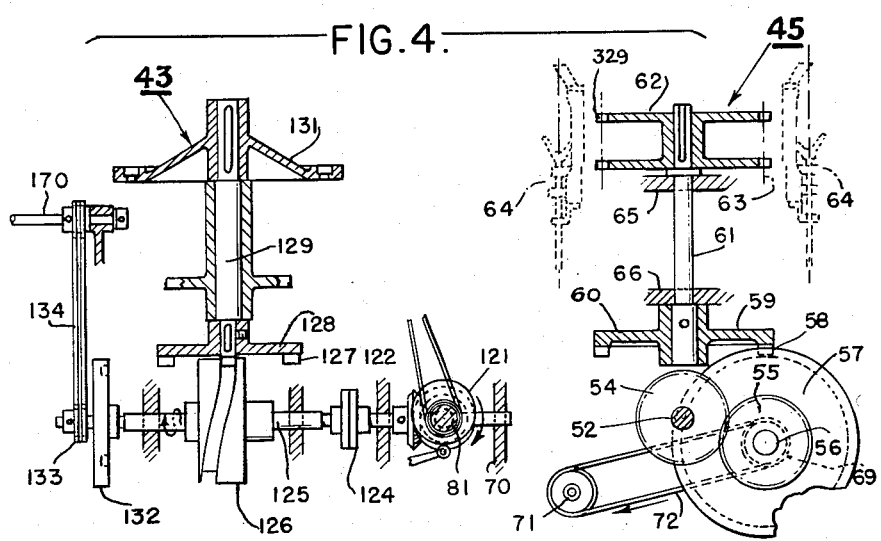

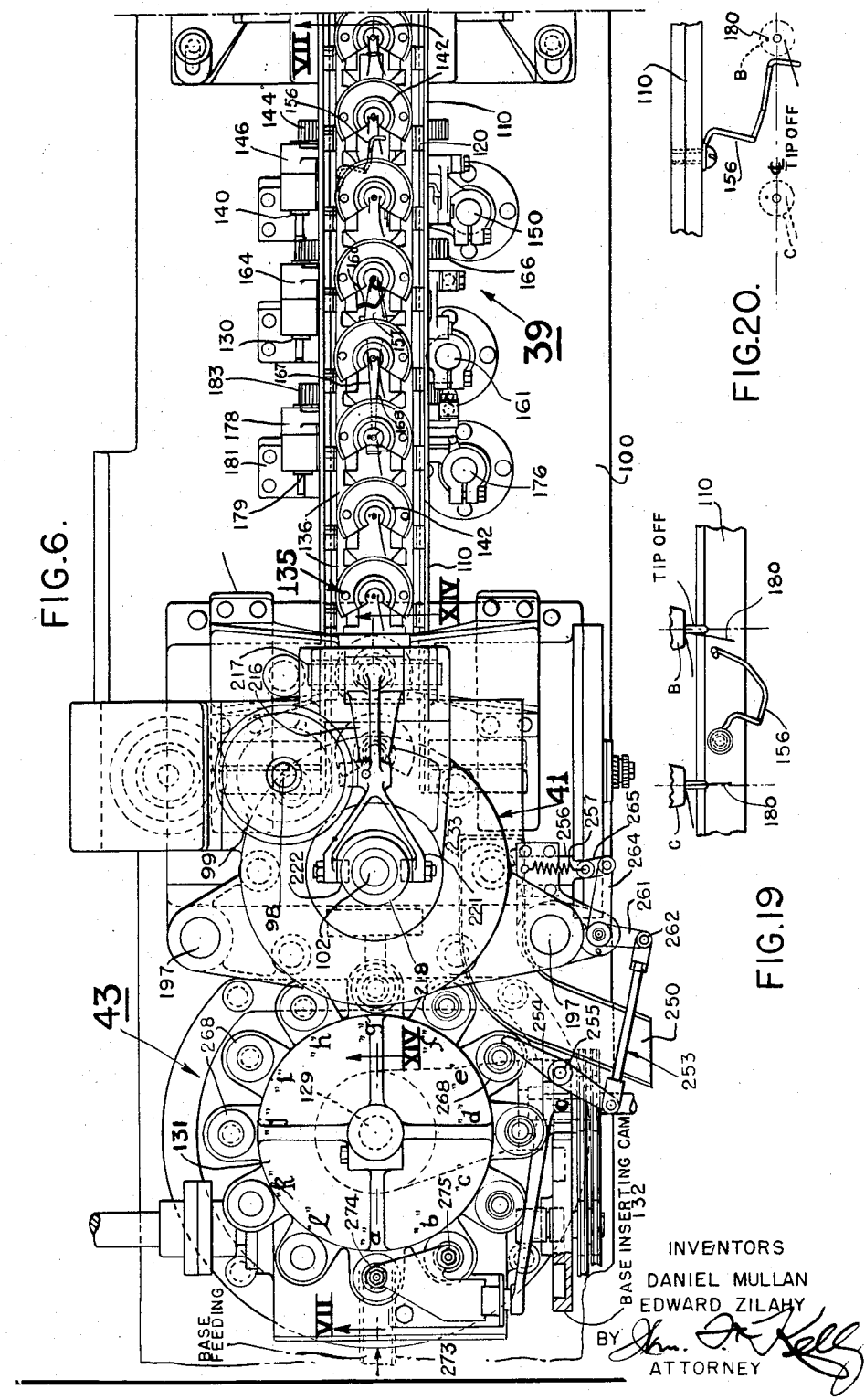

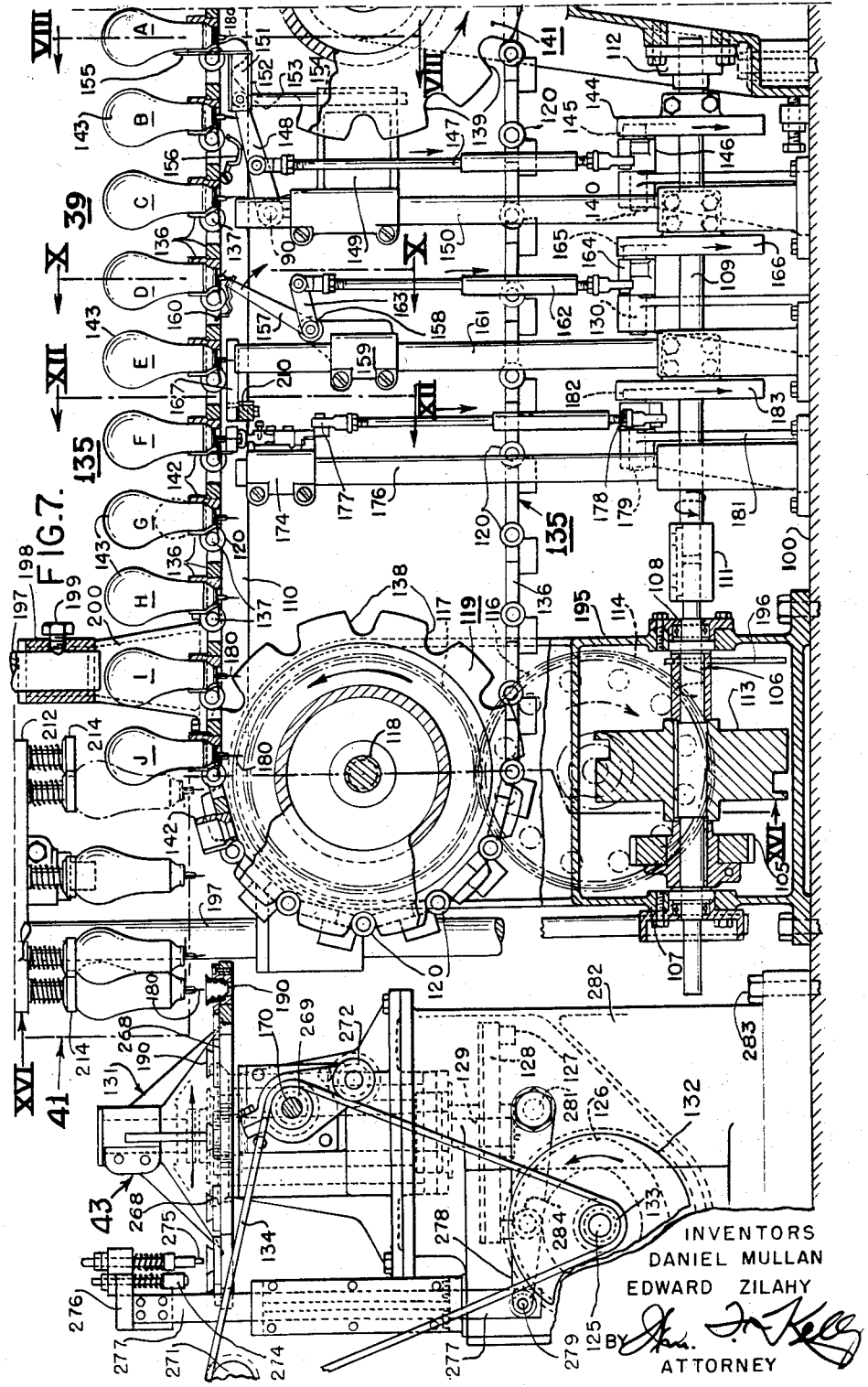

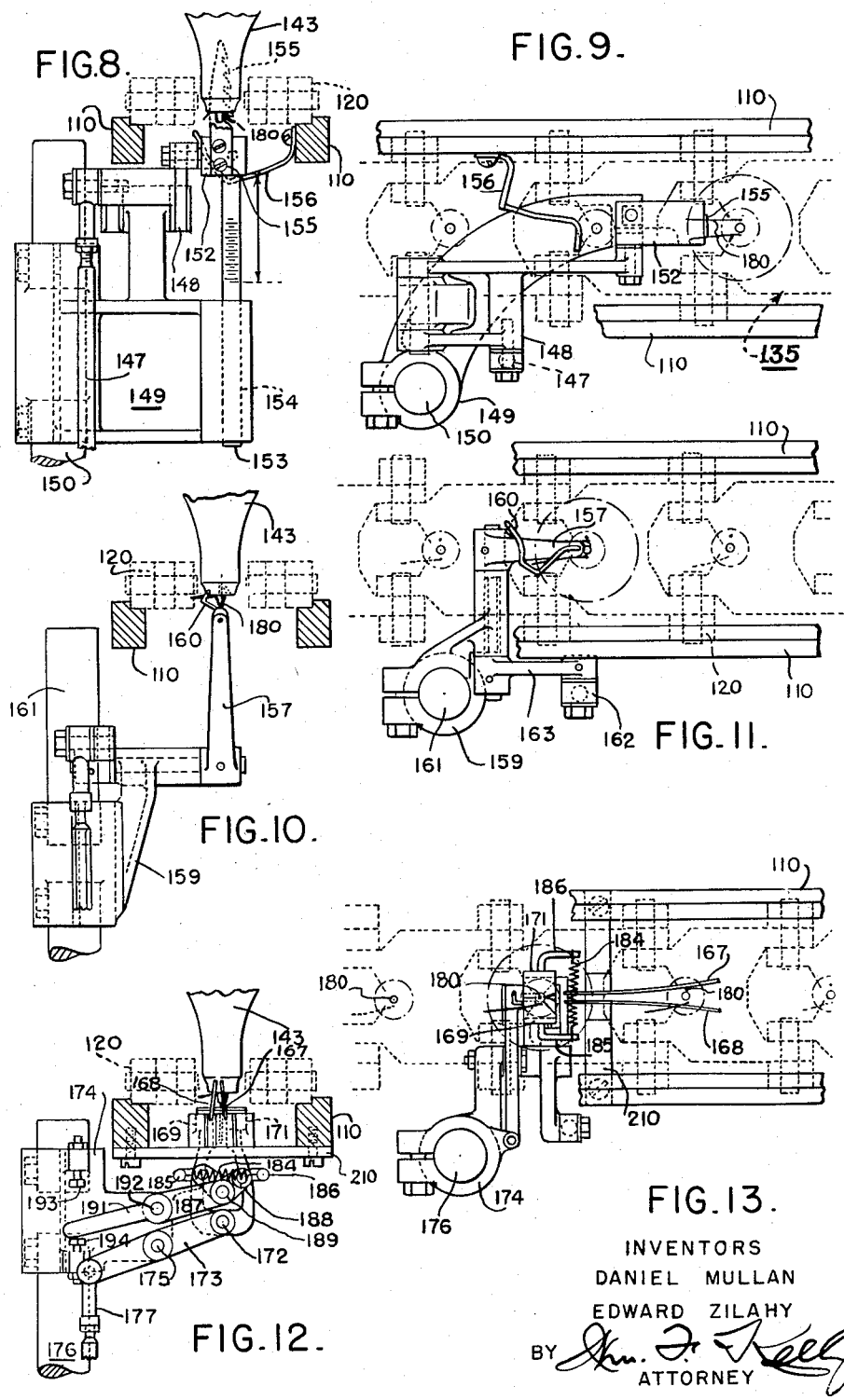

May 17, 1960 D. MULLAN ET AL 2,936,797
HIGH SPEED INCANDESCENT LAMP ASSEMBLING MACHINE
Filed Aug. 12, 1954 9 Sheets-Sheet 7

INVENTORS
DANIEL MULLAN
EDWARD ZILAHY
BY
ATTORNEY

May 17, 1960   D. MULLAN ET AL   2,936,797
HIGH SPEED INCANDESCENT LAMP ASSEMBLING MACHINE
Filed Aug. 12, 1954   9 Sheets-Sheet 8
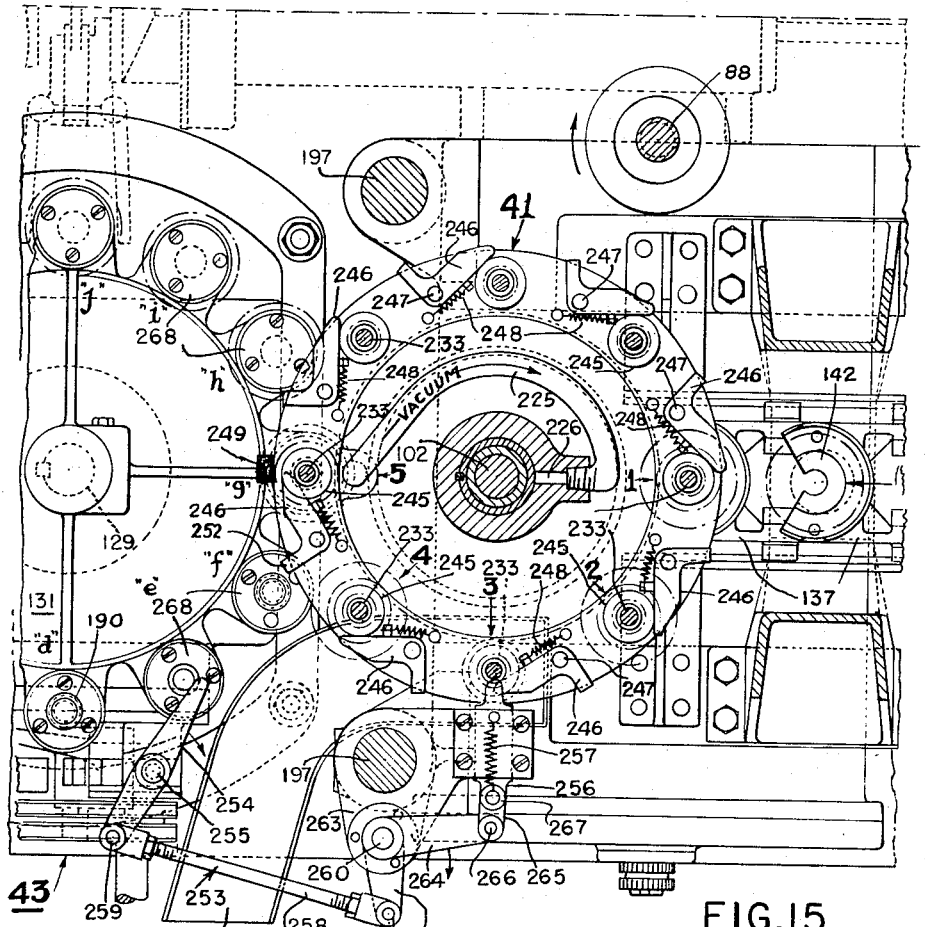
FIG.15.
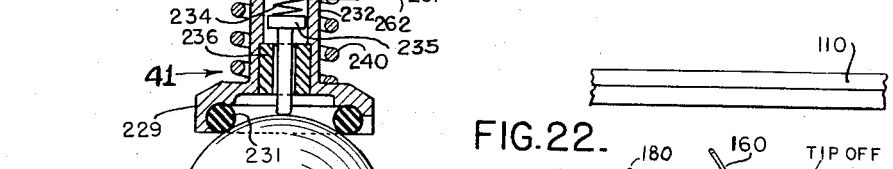
FIG.22.
FIG.21.
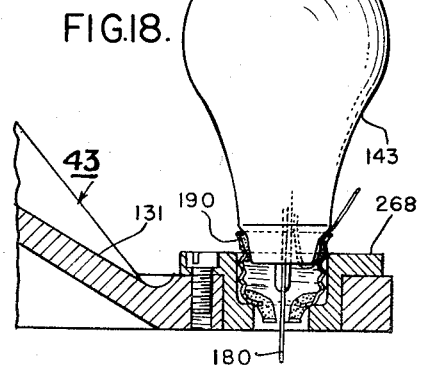
FIG.18.
INVENTORS
DANIEL MULLAN
EDWARD ZILAHY
BY
ATTORNEY

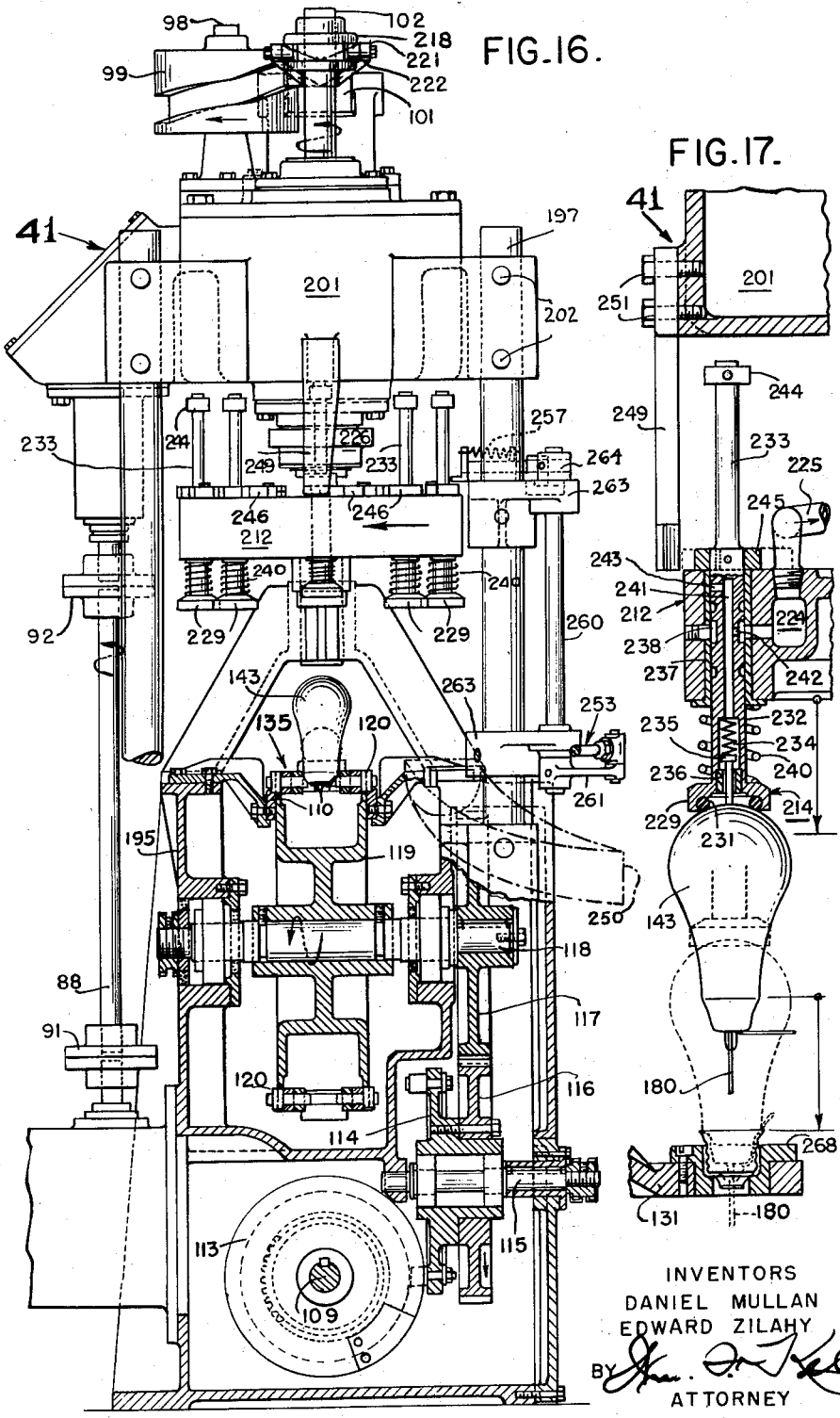

United States Patent Office 2,936,797
Patented May 17, 1960

2,936,797

HIGH SPEED INCANDESCENT LAMP ASSEMBLING MACHINE

Daniel Mullan, Hillside, and Edward Zilahy, Nutley, N.J., assignors to Westinghouse Electric Corporation, East Pittsburgh, Pa., a corporation of Pennsylvania Application August 12, 1954, Serial No. 449,352

8 Claims. (Cl. 140—71.5)

This invention relates to lamp-making machines and, more particularly, to one adapted to automatically make lamps at high production speed.

It is the general object of the present invention to provide automatic apparatus for conveying sealed and exhausted incandescent lamps having a plurality of lead wires from an exhaust machine to lead wire threading apparatus and for positioning one of said lead wires of each lamp while enroute preparatory for reception of the positioned lead wire in the center eyelet of a base.

A further object of our invention is to automatically effect the high speed manufacture of incandescent electric lamps with a minimum of operators and supervision.

Other objects and advantages of the invention will become apparent as the description proceeds.

Referring to the drawing:

Fig. 1 is a diagrammatic plan of the group of machines embodying our invention.

Fig. 2 is a diagrammatic plan, with parts in horizontal section, of the driving mechanism for the group.

Fig. 3 is a diagrammatic elevational view, with parts in vertical section on the line III—III of Fig. 2, in the direction of the arrows.

Fig. 4 is a vertical sectional view on the line IV—IV of Fig. 2, in the direction of the arrows.

Fig. 5 is an elevational view, with parts in vertical section on the line V—V of Fig. 2, in the direction of the arrows.

Fig. 6 is a plan of the lead-wire straightening lamp conveyor unit, the bulb transfer turret unit, and the base-threading machine or unit.

Fig. 7 is a side elevational view, with parts in vertical longitudinal section on the line VII—VII of Fig. 6, in the direction of the arrows, of the units shown in Fig. 6, the present figure showing in addition the lowermost part of the bulb-transfer turret.

Fig. 8 is a vertical sectional view on the line VIII—VIII of Fig. 7, in the direction of the arrows, showing a lamp on a larger scale in the first or "A" position at which one of its lead wires is to be straightened.

Fig. 9 is a plan of that part of the mechanism illustrated in Fig. 8.

Fig. 10 is a vertical sectional view on the line X—X of Fig. 7, in the direction of the arrows, showing a lamp in the third or "D" lead-wire straightening position.

Fig. 11 is a plan of that part of the mechanism illustrated in Fig. 10.

Fig. 12 is a transverse sectional view on the line XII—XII of Fig. 7, in the direction of the arrows, showing a lamp in the fourth, "F," or final position at which straightening of its depending lead wire is effected.

Fig. 13 is a plan of that part of the mechanism illustrated in Fig. 12.

Fig. 15 is a fragmentary plan, with parts in section on the line XV—XV of Fig. 14, in the direction of the arrows.

Fig. 16 is an elevational view, with parts in transverse section on the line XVI—XVI of Fig. 7, in the direction of the arrows.

Fig. 17 is a fragmentary vertical sectional view, corresponding with a part of Fig. 14, showing one of the lamp transfer turret heads and a lamp carried thereby, enlarged and in a different operating position.

Fig. 18 is a fragmentary vertical sectional view, with parts in elevation, corresponding with a part of Fig. 17, showing a suction cup in lower position and a lamp carried thereby in threading position.

Fig. 19 is a fragmentary side elevational view, corresponding with a part of Fig. 7, and showing on a larger scale the second lead wire straightening device.

Fig. 20 is a plan of the straightening device shown in Fig. 19.

Fig. 21 is a fragmentary side elevational view, corresponding with a part of Fig. 7, and showing on a larger scale a part of the third lead wire straightening device.

Fig. 22 is a plan of the part of the straightening device shown in Fig. 21.

Figure 14:
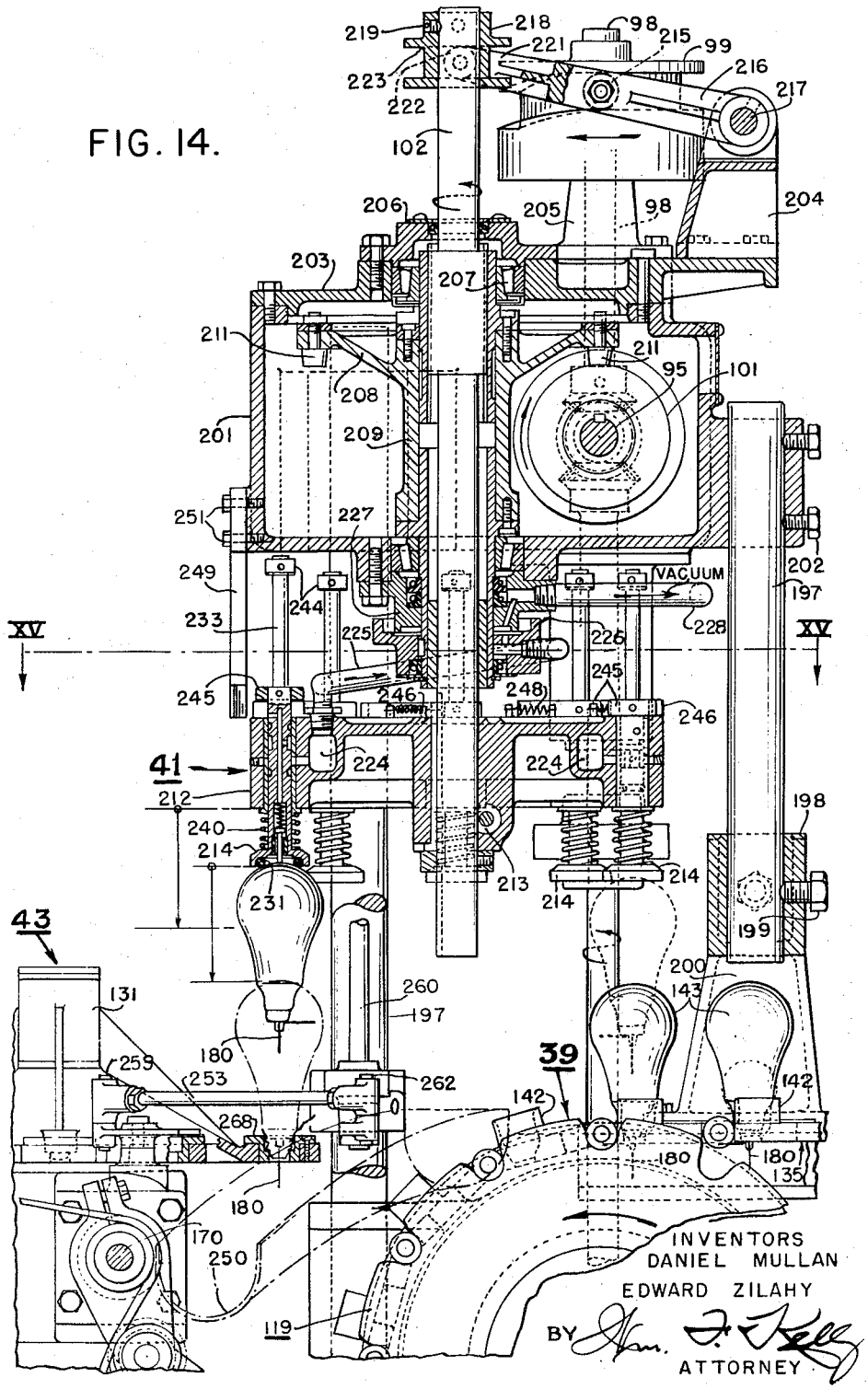
Fig. 14 is a side elevational view to a larger scale, with parts in section on the line XIV—XIV of Fig. 6, in the direction of the arrows, particularly showing the bulb-transfer turret unit, the lowermost part only of which is shown in Fig. 7.

First referring to the diagrammatic plan of Fig. 1, it will be observed that the equipment consists of the following mechanism operated by a single motor, or other primer mover, through shafts connected by gears and other means to cause the various parts of the mechanism to operate in synchronism to automatically assemble lamp parts, bake the basing cement, remove the excess portions of the leads, flux, solder season, and separately eject the good and bad finished lamps from the machine, as an improvement over the use of separate machines for performing the various operations, and the manual transfer of parts or lamps between said machines:

(1) A dual rail gravity bulb chute, which we designate by the reference character 31.

(2) A bulb transfer mechanism 32 between the chute 31 and a sealing machine 33.

(3) The sealing machine 33.

(4) Automatic conveyor mechanism 34 for transferring mounts to a loading turret 35, which feeds them to the sealing machine 33.

(5) The loading turret 35.

(6) Mechanism 36 for transferring connected bulbs and mounts from the sealing machine 33 to an exhaust machine 37.

(7) The exhaust machine 37 for receiving the connected bulbs and mounts from the transfer mechanism 36.

(8) Transfer mechanism 38 for moving the exhausted and sealed lamps from the exhaust machine 37 to a conveyor 39.

(9) The lamp conveyor 39 for receiving the sealed and exhausted lamps from the transfer mechanism 38.

(10) Four lead-wire prepositioning devices, generally designated 40, located along the conveyor 39.

(11) A transfer mechanism or turret 41 for receiving lamps from the conveyor 39.

(12) A base conveyor 42.

(13) An automatic base-threading machine 43, for receiving lamps from the transfer turret 41 and pre-cement-filled bases from the base conveyor 42 and preliminarily uniting said parts by inserting the neck end of each lamp into a base.

(14) A transfer and turnover mechanism 44 for transporting lamps from the base-threading machine 43 to a basing machine 45.

(15) The seventy two head conveyor-type basing machine 45, receiving lamps with associated bases from the transfer and turnover mechanism 44.

(16) Means, such as a lamp inspection and packing table (not shown), upon which only the good lamps are discharged at Station No. "69" of the basing machine.

Brief description of operations

Briefly, the sequence of operations of the machine, the sub-combinations of which have been identified, is as follows. An operator transfers bulbs from shipping cartons or the like to the gravity dual-rail bulb feeder 31, which guides them toward and into pockets of the bulb transfer mechanism or turret 32. The bulb transfer turret 32, indexing clockwise, convey the bulbs one by one to a station where each is monogrammed, and thence to a station where each is transferred to the thirty six head sealing machine 33.

The mounts are fabricated from component parts, as on an automatic stem and mounting machine (not shown), and the completed mounts automatically transferred to within reach of an operator. The operator inspects such mounts and transfers the good ones to the conveyor mechanism 34, from whence they are automatically transferred to the mount-loading turret or conveyor 35. The mount-loading conveyor 35, indexing clockwise, conveys the mounts one by one to a station where their lead-wires and stem presses are pre-positioned. From this station, the mounts are conveyed to a station where each is automatically transferred to a spindle on the sealing machine 33.

The sealing machine 33 is equipped with thirty six sealing heads, each consisting of a sealing spindle which supports a bulb. Indexing counterclockwise, it conveys the mount-loaded head toward the bulb-loading station, and on around through several stations, each equipped with burners appropriately directed toward a bulb in a holder at its place of engagement with a mount to assure proper amalgamation to the flare of said mount and the severance of the cullet from the bulb.

The sealed bulb is thereafter subjected to the action of a molding device which accurately forms a shoulder at a prescribed distance above the sealed end of each bulb, and then passes through several bulb-annealing stations to one where each bulb is automatically removed from its head by the transfer mechanism 36. A mount-detector device, operated in conjunction with the bulb-transfer turret 32, prevents bulbs being loaded onto sealing heads which have not received mounts.

The exhaust machine 37 is equipped with thirty six exhaust ports and indexes counterclockwise. Located between the sealing machine 33 and the exhaust machine 37 is the transfer mechanism 36 which unloads each sealed bulb from its sealing head and loads it into an exhaust port. A second transfer mechanism 38 unloads each exhausted and tipped-off lamp from an exhaust port and loads it onto the lamp conveyor 39. The conveyor 39 is equipped with mechanism generally designated 40, which preposition the remote lead wires of the lamps for passing through the center eyelets of bases, preparatory to automatic assembly with such bases.

Base feeding mechanism 42 conveys bases, pre-filled with cement, to the base-threading turret or machine 43, which indexes counterclockwise. This machine is equipped with devices to assure proper seating of each base in its holder or cup, and that each base has an unobstructed eyelet. A transfer turret 41 is equipped with vacuum pick-up cups and indexes clockwise. Each vacuum cup picks up a lamp from conveyor 39 and lowers it into a base at a station directly opposite and on the base-threading machine or turret 43.

The based lamp in turret 43 is indexed to a station where it is automatically picked up by transfer and turnover mechanism 44 and loaded into a head of the basing machine 45. The basing machine is equipped with the necessary cement-baking fires, base air cooling jets, and also lead-wire-prepositioning, trimming, fluxing and soldering devices. It is also equipped with the necessary lamp-seasoning and inspection facilities, as well as with a device to separate defective lamps from good ones.

In the present application the specific description and claims are particularly directed to the straightening of lead wires and the assembly of bases with bulbs, preparatory to transfer to the basing machine. The remainder of the machine is specifically described and claimed in a copending application, similarly entitled, and filed concurrently by the same inventors.

Drive mechanism

The power means for driving the mechanism, heretofore briefly described, and the details of which are most clearly seen in Figs. 2 to 5, incl., consists of an electric motor or other prime mover 46, connected to a pulley 47 at the side of a gear box 48 of the basing machine 45, as by means of a belt 49. Extending from the gear box 48 at right angles to the shaft of the pulley 47, is a shaft 51 driven from said pulley by means of suitable gears in the box 48, but not shown. The right hand end of the shaft 51, as viewed in Fig. 2, connects by means of suitable gears and shafts with the exhaust machine 37 and the sealing machine 33, so that they and the mechanism associated therewith are driven in synchronism with the basing machine 45.

The other end of the shaft 51 is connected to the main drive shaft 52, by means of a suitable clutch mechanism, not shown in detail but generally designated 53, so that it is automatically disconnected in case an accident happens which impedes the operation of the machine, in order to avoid breakage. The main shaft 52 is mounted in bearings 50 carried by the frame of the machine, and carries a spur gear 54 at its left hand end, as viewed in Fig. 2, meshing with a spur gear 55 on a shaft 56 which carries a drive wheel or index cam 57. The cam 57 meshes with a gear 60 formed as a series of rollers 58 depending from a spider or wheel 59 on a vertical drive shaft 61 for the basing machine 45. The upper end of the shaft 61 carries a sprocket wheel 61 around which passes a chain 63 carrying lamp holders 64.

The shaft 61 is mounted in suitable upper and lower bearings 65 and 66 formed on the frame of the machine. By virtue of the connection between the drive or index cam 57 and the gear 60, the chain 63 is driven step-by-step so that the lamp holders 64 successively index from station to station, as will be understood. This step-by-step drive is not disclosed in detail, as it is similar to the drive disclosed in the Green Patent No. 2,569,852, dated October 2, 1951, the drive cam 57 and gear rollers 58 corresponding respectively with the parts 114 and 113 of said patent.

The shaft 56 has its ends mounted in bearings 67 and 68 carried by the frame of the machine, and its extreme left end, as viewed in Fig. 2, carries a sprocket wheel 69 driving a sprocket wheel 71 by means of a chain 72. The sprocket wheel 71 is mounted on a timing shaft 73, the ends of which are carried in bearings 74 and 75 supported by the frame of the machine.

The right hand end portion of the shaft 52, as viewed in Fig. 2, has fixed thereon a spur gear 76 meshing with an idler spur gear 77. The gear 77 in turn meshes with another idler spur gear 78, journalled on a shaft, the ends of which are fixed in the frame of the machine. Through gear 78 motion is transmitted to a spur gear 79 on, and adapted to be clutch-connected to, the bulb turnover and transfer mechanism drive shaft 81, journalled in fixed bearings.

The shaft 81 carries a spur gear 82 adapted to be clutch-connected thereto and meshing with spur gear 83 fixed on shaft 84. The shaft 84 has fixed thereon a bevel gear 85, meshing with a bevel gear 86, fixed on the bottom of a vertical shaft 87 journalled in fixed bearings. The shaft 87 operates shafts 88 and 89 through couplings 91 and 92. The shaft 89 is journalled in fixed bearings and has fixed thereto at its upper end a bevel gear 93, meshing with a bevel gear 94 fixed on the horizontal shaft 95, journalled in fixed bearings.

The shaft 95 has fixed thereon a bevel gear 96 meshing with a bevel gear 97 fixed on the lower end of a vertical shaft 98, journalled in fixed bearings, and having a cam wheel 99 fixed on its upper end engaged by a roller 215 carried by the intermediate portion of a lever 216, the free end of which is connected to the shaft 102 for raising and lowering the transfer turret 41. Said shaft 95 also carries a transfer turret index cam 101, which engages an indexing gear splined on the turret shaft 102.

The spur gear 83 meshes with an idler spur gear 103 journalled on a fixed stud 104. The gear 103 also meshes with a spur gear 105 fixed on one end of the conveyor cam shaft 106 journalled in fixed bearings 107 and 108. The cam shaft 106 has an extension 109 connected thereto by a coupling 111, and with its other end journalled in a fixed bearing 112.

The cam shaft 106 has fixed thereon an index cam wheel 113, which successively engages rollers outstanding from a wheel to form an indexing gear 114, fixed on a short shaft 115 turnable in fixed bearings. The shaft 115 also has fixed thereon a spur gear 116 meshing with a spur gear 117 fixed on a shaft 118 journalled in fixed bearings. Also fixed on the shaft 118 is the drive sprocket wheel 119 over which passes the lamp carrying chain of the conveyor 39.

The shaft 81 also has a sprocket wheel 70 fixed thereon and meshing with a chain which drives the transfer and turnover mechanism 44. Fixed on the shaft 81 is a cam 80 which operates part of said mechanism 44. The left hand end of the shaft 81 has a bevel gear 121 fixed thereon and meshing with a bevel gear 122 fixed on a shaft 123 journalled in fixed bearings. The shaft 123 is connected by a coupling 124 to a shaft 125 journalled in fixed bearings.

The shaft 125 has fixed thereon an indexing cam 126 engaging rollers 127 rotatably mounted on and depending from a plate, forming a gear 128 fixed on the bottom of a shaft 129, journalled in a fixed bearing, and on the top of which is fixed the base holding turret 131. The shaft 125 also carries a cam 132 which operates means for processing bases, as will be subsequently described. Near the end of the shaft 125 is a sprocket wheel 133, fixed thereon, and over which a chain 134 passes for driving the shaft 170 for actuating the base-feeding hopper (not shown).

*The lead-wire-straightening lamp conveyor*

The lamp conveyor 39, the details of which are most clearly illustrated in Figs. 6 to 16 and 19 to 22 incl., comprises a chain 135 formed as a series of lamp-holding links 136 connected together by pivot pins 137. These pivot pins connect the right hand arms of the links, as viewed in Fig. 7, with the adjacent links left hand arms intermediate thereof, the shapes of the links being as shown dotted in plan in Figures 9, 11 and 13. The outer end of each pivot pin carries a roller 120 receivable in notches 138 in the conveyor drive sprocket wheel 119, and notches 139 in the conveyor driven sprocket wheel 141. The rollers 120 on the upper reach of the chain 135, while disposed between the sprocket wheels 119 and 141 are supported by and travel on rails 110, secured to the frame 195 of the machine. Each link 136 has an upwardly opening socket 142, which also opens forwardly or toward the left as viewed in Fig. 7.

Each socket 142 is adapted to snugly receive the neck of a bulb of an exhausted and sealed lamp 143, as it is delivered thereto, either by the transfer mechanism 38 or by hand, adjacent the right hand end of the conveyor, as viewed in Figs. 6 and 7. These lamps are sequentially placed in the sockets 142 adjacent the right hand end of the conveyor, as said conveyor moves from right to left, with the lead-wires spread apart and pointing diagonally outward and toward the left.

The first of these lead-wire prepositioning devices is shown in Fig. 7, and more in detail in Figs. 8 and 9. It consists of a cam 144 fixed on the cam shaft extension 109, and engaging a roller 145 on the intermediate portion of a lever 146. The remote end of said lever, as viewed in Fig. 7, is pivoted about a pin 140 in a fulcrum casting projecting from the base 100 of the machine. The near end of said lever 146 is pivoted to the bottom of an adjustable link 147. The upper end of the link 147 is pivotally connected to the intermediate portion of a lever 148, the left hand end of which, as viewed in Fig. 7, being pivoted to the upper portion of a guide casting 149, as indicated at 90.

The casting 149 is adjustably mounted on a pedestal 150 extending from the base 100 of the machine. The free end of the lever 148 is pivoted to a block 151 which is horizontally reciprocable in a head 152 on the upper end of a guide rod 153. The lower end of the guide rod 153 is reciprocable in an aperture 154 in the guide casting 149. The head 152 carries a toothed blade 155 adapted to slide between and, if necessary, separate the lead wires, and slide over the remote lead-wire 180 of a lamp when at position "A," as viewed in Fig. 7 on upward movement, and pull down on said lead wire on downward movement, to initially shape the same. Upward and downward movement of this rod 153, and its head and toothed blade 155, is effected by movement of the lever 148.

Upon being carried to the left, as viewed in Fig. 7 through positions "A" and "B" the initially shaped lead-wire 180 which has been pulled down by the toothed blade 155, engages the horizontal portion of a wire 156 (see Figs. 8, 9, 19 and 20), which is fixed to a rail 110 of the machine, so that said lead-wire is pushed back or to the right a desired amount, as the lamp 143 moves to the left.

Upon reaching position "D," the lead-wire 180 is engaged and wiped by a wire 160 during clockwise movement thereof (Figs. 7 and 21) which wire 160 is carried on the end of the long arm 157 of a bellcrank lever 158, pivoted to a fulcrum casting 159. (See Figs. 7, 10, 11, 21 and 22.) The latter is adjustably mounted on a pedestal 161 extending from the base 100 of the machine. This bell-crank lever 158 is operated by an adjustable link 162, the upper end of which is pivoted to its other arm 163 and the lower end of which is pivoted to the free end of an operating lever 164. The intermediate portion of the lever 164 carries a roller 165, engaged by an operating cam 166 fixed on the shaft 109. The other end of the lever 164 rotates about a pin 130 in a fulcrum casting projecting from the base 100 of the machine.

Upon reaching position "E," the depending lead wire, which has been three times manipulated by the devices described, passes between flexible guide members 167 and 168, secured to a cross member 210 connecting the rails 110 and attached thereto, as shown most clearly in Figs. 7, 12 and 13, so that it is gradually drawn toward the central plane of the conveyor. When the lamp reaches position "F," the depending lead-wire, now straightened and positioned on the central plane of the conveyor, is grasped by the final straightening jaws 169 and 171 (Figs. 12 and 13).

These jaws have leaves or flanges which intermesh as they close about a lead wire. Their lower ends are pivoted together, as indicated at 172, and to one end of an operating lever 173. The intermediate portion of the lever 173 is pivoted to a fulcrum casting 174, as indicated at 175. Said casting is adjustably mounted on a pedestal 176 (Fig. 7) extending upwardly from the base 100 of the machine.

The other end of the lever 173 is pivoted to the upper end of an adjustable link 177, the lower end of which is pivoted to the near end of a lever 178, as viewed in Fig. 7. The other end of said lever 178 turns about a pin 179 in a fulcrum casting 181 mounted on the base 100 of the machine. The intermediate portion of said lever 178 carries a roller 182 engaged by a cam 183 fixed on the shaft 109.

The straightening jaws 169 and 171 (Figs. 12 and 13) are held in normally closed position by a spring 184 pulling on studs 185 and 186 respectively projecting from the jaws 169 and 171. These jaws are also connected by a toggle comprising links 187 and 188, connected by a pivot pin 189. The pivot pin 189 also connects these links with one end of a latch member 191, the intermediate portion of which is pivoted at 192 to the fulcrum casting 174. The other end of the latch 191 is adapted to oscillate between adjusting upper and lower set screws 193 and 194, mounted on the casting 174.

In the position illustrated in Fig. 12, the jaws 169 and 171 are shown at the end of the down stroke of the rod 177, ready upon reverse movement of said rod to pull down on the pre-straightened lead 180 depending from the lamp 143. This pull-down on the lead continues during the upstroke of the rod 177, until the latch 191 engages and its movement with the rod is stopped by the upper set screw 193. This relative movement, upon continuing upward movement of the rod 177, after arresting the movement of the latch 191, straightens out the toggle against the action of the spring 184 and releases the lead-wire, leaving the jaws 169 and 171 in open position.

Because of the toggle arrangement, these jaws stay in open position until they are returned upwardly to a position on either side of a depending lead-wire of a subsequent lamp. Then the latch 191 is engaged by the lower set screw 194, thereby effecting a return relative movement, tripping the toggle and returning the jaws 169 and 171 to a closed position, grasping the depending lead wire and ready for another pull-down operation.

It will, therefore, be seen that as the lamps travel through positions "A" to "F," incl., they have one of their lead wires accurately straightened or pulled down, leaving the other lead-wire extending generally horizontally therefrom. The lamps are then conveyed until they have reached position "J." Here they are sequentially engaged by a suction cup on the transfer turret 41 for removal to the base-threading machine 43.

*The transfer turret*

The transfer turret, generally designated 41, is shown most clearly in Figs. 6, 7, 14, 15, 16 and 17. It is adjustably supported by three rods 197 from the frame 195 of the conveyor machine. Said frame includes a housing for the index cam wheel 113, the spur gear 105, and the oiling ring 196 on the cam shaft 106. Two of the rods 197 have their lower ends received in sockets in the machine frame. The other rod is held in a socket 198 in a casting 200, secured to the frame and which straddles the conveyor chain 135, as by means of set screws 199. The upper ends of the rods 197 are received in sockets formed on the side of the housing 201, as by means of set screws 202. The housing 201 is generally hollow cylindrical and closed at its top by means of a bearing plate 203, held in place as by means of bolts. On this bearing plate is supported a fulcrum casting 204 and the bearing plate 205 for the shaft 98, to which is fixed the cam 99.

The bearing plate 203 also carries an oil seal 206 over a roller bearing assembly 207. The housing 201 encloses the transfer turret index cam 101 which is fixed on the shaft 95, as well as the gear 208 which it drives. This gear is formed with a hub 209 splined on the shaft 102, so as to turn the shaft but allow independent reciprocation thereof. The hub 209 has a series of depending conical rollers 211, which form the gear and travel in the thread of the cam 101. This causes the gear 208 to index one-eighth of a revolution with each revolution of the index cam 101. A transfer head 212 is supported on the lower end portion of the shaft 102 by means of a tightened bolt 213. There are eight suction cups 214 depending from said head 212.

Reciprocation of the shaft 102 and the head 212 carried thereby is effected by turning of the cam wheel 99 in the thread of which travels the roller 215 carried by an intermediate portion of the lever 216, previously referred to in connection with the description of the drive mechanism. One end of said lever is pivoted to the fulcrum casting 204, as indicated at 217, and the other end is bifurcated and straddles a collar 218, adjustably mounted on the upper end of the shaft 102 as by means of set screws 219. The bifurcations 221 on the lever 216, each carry a roller 222 received in a groove 223 in the collar 218. The rollers 222 are thus allowed to slide horizontally in said groove as the shaft 102 is vertically reciprocated upon oscillation of the lever 216, thereby effecting the desired upward and downward movement of the head 212.

The head 212 has a vacuum manifold 224 connected to a vacuum line by means of a flexible pipe 225. The latter is connected to a cap 226 on the lower end of the housing 201. This cap communicates with an intermediate cap 227 on said housing 201, from which a pipe 228, which may be flexible, extends to a convenient source of vacuum.

Each suction cup 214 is formed, as shown in detail in Fig. 17, with a lower downwardly-opening pocket portion 229, lined with a rubber or other resilient and preferably toroidal gasket member 231. Extending upwardly from the pocket portion is a hollow stem portion 232 terminating in a solid rod 233. The hollow interior of the portion 232 is enlarged at its lower portion to receive a return spring 234 for a valve member 235. The latter normally engages a valve seat member 236, held in the hollow portion 232. The valve member 235 normally extends downwardly beyond the pocket portion 229, so as to be engaged by the bowl of a lamp 143 being processed, when brought down thereupon. Such engagement effects an opening of the valve, to thereby provide the desired lifting force on the lamp for transferring the same from the conveyor 39.

The head 212 has a series of bushings 237, one for each suction cup, apertured to allow communication therethrough with the manifold 224. Each stem portion 232 has an annular groove 238 communicating with the hollow interior cavity 241 by means of a port 242. An exhaust port 243 extends from the upper end of the cavity 241 to the outer surface of the stem 232. Each solid suction cup extension 233 has secured thereto an upper collar 244 and a lower collar 245. The position of the lower collar is such that when it lies flush with the top of the head 212, being normally biased to such position by its return spring 240, the interior of the stem 232 is in communication with the vacuum manifold 224.

The head 212 carries a series of angular latches or dogs 246, rotatably mounted on pins 247 and biased by springs 248, so that their long legs tend to engage, either the collars 245 or, upon raising the suction cups, the stems 232 therebeneath. Thus, upon such raising, the dogs move to underlie the collars 245 and hold said suction cups in exhaust or non-vacuum position with respect to lamps being processed. In order to insure that the suction is on each head when it reaches position "1," where it is supposed to lift a lamp in position "J" from the conveyor 39, a rod 249 is secured to the housing 201 as by means of bolts 251. The rod 249 is in such a position that as the head 212 rotates, the tails 252 of any of the dogs 246 which at position "5" underlie any of the collars 245, are engaged and tripped to allow the collars 245 to drop down to engage the top of the head 212, as viewed in Fig. 17.

In order to prevent the delivery of a bulb to a cup 268 on the base-threading machine 43, and effect its discharge to chute 250, when there is no base positioned in said cup for connection thereto, feeler mechanism 253 is provided. Such comprises a lever 254 pivoted on the frame of the base-threading machine 43, as indicated at 255, and with its inner end extending over a cup 268 of the threading turret 131 when indexed, so as to be turned clockwise, as viewed in Fig. 15, when a base is in position in said cup. A latch 256 is provided which, when no base is in place, moves under spring bias into close proximity with a rod portion 233, and interferes with downward movement thereof by engaging the collar 244 thereon. This allows the head 212 to overrun the latch-stopped suction cup 214, so that it moves to a vacuum-shut-off position and is held up in such position by its dog 246.

The connection between the lever 254 and the latch member 256, mounted for reciprocation toward and away from an indexed rod 233, and biased inwardly by a spring 257, is through connecting rod 258, one end of which is pivoted to the lever 254 as indicated at 259. The other end of the rod 258 is pivoted, as indicated at 262, to a crank 261, fixed on a vertical shaft 260. The shaft 260 is rotatable in fulcrum castings 263 secured to one of the rods 197. A crank 264 is fixed on the shaft 260 above the lever 261, and its free end is pivoted to a link 265, as indicated at 266. The other end of the link 265 is pivoted to the latch 256 as indicated at 267. Thus, when a base is in place, the latch 256 is withdrawn and the vacuum connection to an indexed suction cup 214 is not broken when said cup engages a lamp 143 at position "3" on transfer turret 41. If, however, there is no base in place, the latch 256 is not withdrawn and the suction on the lamp at position "3" is released, allowing said lamp to be dropped into chute 250 for removal from the machine.

*The base-threading machine*

The base-threading machine, generally designated 43, and viewed more clearly in Figs. 4, 6, 7, 14 and 15, comprises a turret 31 indexed from station to station by the cam 126 engaging rollers 127 depending from a plate and forming the gear 128 fixed on the shaft 129 of said turret. As the turret 131 indexes from station to station, there being in the present embodiment twelve stations, "a" to "i," incl., a base 190 is fed to each of its pockets or cups 268. These bases may be fed from a hopper (not shown) but adapted to be driven from a shaft 170. Said shaft is, in turn, driven by the chain 134 from sprocket wheel 133 on shaft 125. The chain 134 passes over sprocket wheel 269 on the hopper drive shaft 170 and over idler pulley 271. A tightener pulley 272, engaging the chain 134, is also provided.

The bases 190, after leaving the hopper prefilled with the desired amount of basing cement, pass on to the guiding chute 273 from whence they are automatically, or by hand, fed one by one to each cup 268 as it is indexed at station "a." At said station "a" the base is also forced tightly into the cup by resiliently mounted pusher element 274. At station "b" its central eyelet or aperture is entered by a pronged element 275, to insure that it is open for reception of the straightened lead wire of a lamp 143, to which the base is to be connected.

Both of the elements 274 and 275 are mounted on a head 276 secured to a vertically reciprocable rod 277, moved up and down in synchronism with the indexing of the turret 131 by a lever 278. The left hand end of said lever 278, as viewed in Fig. 7, is pivoted, as indicated at 279, to the bottom of the rod 277. The other end is pivoted, as indicated at 281, to the housing 282 of the threading machine 43. Said housing is mounted on the base 100, as by means of bolts 283. An intermediate portion of the lever 278 carries a roller 284 engaged by the cam 132, so that said lever 278 oscillates up and down as said cam turns.

The bases index from initial station "a" through stations "b", "c" and "d" until, upon reaching station "e," they engage and turn clockwise the feeler lever 254. This insures that the lamp at station "3" is not ejected from the transfer turret 41, by withdrawing the latch 256 and preventing it from interfering with the suction on the carrying cup 214. Upon reaching station "g" on the threading turret, a lamp held by a suction cup 214, when at station "5," descends causing its straightened lead to pass through the center eyelet of the base 190 therebeneath. The neck of the bulb is, at the same time, forced into engagement with the cement held in the base.

By virtue of the fact that this movement of the lamp to engage the base is to a slightly higher level because the base elevates it to that extent, than that at which the lamp was when picked from the conveyor (a satisfactory differential in the present embodiment being about 5/16"), the holding suction cup 214 is moved with respect to the carrying head 212 so that the vacuum connection is cut off, and the dog 246 snaps to vacuum-cut-off position under the collar 245. Upon return of the cup, the lamp is thus left in the base. This dog is, however, tripped immediately thereafter by the rod 249, so that the suction cup is available for picking up the next lamp.

Upon having a lamp positioned in engagement with a base, the lamp and base travel on through stations "h" and "i". At station "j" they are picked up and transferred to the basing machine 45, by the transfer and turnover mechanism 44. Said basing machine and transfer and turnover mechanism form the subject matter of a copending application filed concurrently herewith. If, however, a base fails to receive a lamp neck at station "g," it is merely loosened, as described in said application, but of course not picked up and transferred to the basing machine when it reaches station "j." Any base so left may be removed by hand at station "k" or "l," but is preferably forcibly ejected automatically at station "k," as by means will be described and claimed in the application previously referred to.

*Operation*

From the foregoing description, it will be seen that lamps may be processed in the following manner on the apparatus specifically described. With machine in operation, lamps 143 are loaded one by one at the position preceding or that designated "A" on the conveyor chain 135, either automatically or by hand, with their leads spread apart and pointing diagonally outward and toward the left, as viewed in Figs. 6 and 7. Upon reaching position "A" at the next indexing movement, the remote lead wire 180, as viewed in Fig. 7, is (if necessary) spaced from the near lead wire and pulled down by operation of the toothed blade 155. During movement from position "B" to position "C," this lead wire 180, which was pulled down, is engaged by the stationary forming wire 156 and bent slightly backward.

Upon further travel, the lamp reaches position "D," where the same lead wire is engaged by the forming wire 160 which pulls downwardly and backwardly on it to further straighten it as desired. Upon reaching position "E," the partially formed lead wire starts to pass between the fixed but flexible guide members 167 and 168, which draw it toward the longitudinal central vertical plane of the conveyor.

Upon reaching position "F," the wire is grasped by the jaws 169 and 171 and drawn downwardly to a final straightening position. Upon reaching position "J" the top of the bulb of the lamp 143 is engaged by a suction cup 214 of the transfer turret 41, while indexed at its station "1," it being understood that these cups reciprocate vertically with the transfer head 212 by operation of the cam wheel 99. The elevation of the lamp at station "J" is such that upon engagement of the suction cup therewith, the relative position of the cup 214 with respect to its transfer head 212 is as viewed in full lines in Fig. 17. Thus, even upon a slight further downward movement of said head 212, there is a connection between the exhaust manifold 224 and said suction cup 214. Upon the valve 235 being raised by engagement with the lamp, said lamp 143 is pulled by suction into tight engagement with the toroidal gasket 231, so that it is lifted and carried around the transfer head 212 successively through station "2" to station "3," as said head reciprocates up and down while rotating clockwise.

If a base 190 is in place at station "e" of the base-threading machine 43, then the lamp is carried on through station "4" to station "5" where, upon downward reciprocation of the head 212, the neck of a bulb 143 is brought into engagement with the basing cement in a base 190 held in a cup thereneath in the base holding turret 131 when at station "g." On account of the higher elevation of the lamp 143 when its neck is received in a base 190 on the turret 131, as compared with that of a similar lamp when held in a socket 142 in the conveyor 135, movement of the turret 212 from the lamp after being deposited in its base is only after relative movement of the suction cup 214 to such an extent that its dog 246 snaps into position beneath its collar 245. This means that there is then no suction applied to the cup 214, so that the lamp is left in its base. From there, the lamp and base are carried on to station "j" on the base-threading machine 43, where it is engaged by the transfer and turnover mechanism 44 and carried on to the basing machine 45 for finishing.

If, however, there should be no lamp 143 to be united with a base 190 when it appears at station "g" on the base-threading machine 43, the said base is merely loosened, but of course not removed, at station "j," but carried forward to the succeeding station "k," where it is either forcibly ejected automatically by mechanism, which will be described in the companion application before referred to, or removed by hand.

Although a preferred embodiment has been disclosed, it will be understood that modifications may be made within the spirit and scope of the invention.

We claim:

1. In apparatus of the character described, conveyor mechanism for transferring bulbs sealed and exhausted and adjusting a lead wire of each enroute for reception in the center eyelet of a base, comprising a pair of spaced sprocket wheels turnable about horizontal axes, a chain passing thereover, said chain being formed of links pivoted together, the outer ends of the pivot means carrying rollers, rails supporting said rollers when their carrying links form the upper reach of said chain, each link of said chain having an upwardly opening socket which also opens toward the direction of movement and is adapted to snugly receive the neck of a bulb of an exhausted and sealed lamp, a first lead-wire prepositioning device comprising a motor-driven cam shaft, a cam fixed on said shaft, a lever oscillatable vertically by said cam, a guide casting fixedly supported beneath the upper reach of said chain, means pivoting said lever to said casting, a guide rod vertically reciprocable in said casting, a head secured to the upper end of said rod, a toothed plate projecting from said head for engagement with a lead wire of a lamp carried by said chain, a block horizontally reciprocable in said head, means pivoting the free end of said lever to said block to operate said toothed plate, a second lead-wire prepositioning device comprising a wire secured to one of said rails beneath the path of movement of said lamps for engaging and shaping a depending lead wire after it has been pulled down by said toothed blade, a third lead prepositioning device comprising another cam on said shaft, another lever operated by said cam, a wire carried by the free end of said lever and shaped for effecting a lead wire straightening operation, flexible guide members secured to said rails for guiding such a depending lead wire to the vertical central longitudinal plane of the conveyor, a fourth lead-wire prepositioning device comprising a third cam on said shaft, and jaws operated by said cam to effect a pull-down and final straightening operation on said lead wire, prior to the removal of the bulb, from which it depends, for connection with a prefilled base.

2. In apparatus of the character described, conveyor mechanism for transferring bulbs sealed and exhausted and adjusting a lead wire of each enroute for reception in the center eyelet of a base, comprising a pair of spaced sprocket wheels turnable about horizontal axes, a chain passing thereover, said chain being formed of links pivoted together, the outer ends of the pivot means carrying rollers, rails supporting said rollers when their carrying links form the upper reach of said chain, each link of said chain having an upwardly opening socket which also opens in the direction of movement and is adapted to snugly receive the neck of a bulb of an exhausted and sealed lamp, a lead wire prepositioning device comprising a cam shaft driven synchronously with said conveyor, a cam fixed on said shaft, a lever oscillatable vertically by said cam, a guide casting fixedly supported beneath the upper reach of said chain, means pivoting said lever to said casting, a guide rod vertically reciprocable in said casting, a head secured to the upper end of said rod, a toothed plate projecting from said head for engagement with a lead wire of a lamp carried by said chain, a block horizontally reciprocable in said head, and means pivoting the free end of said lever to said block to operate said toothed blade, in order to effect a straightening operation on said lead wire.

3. In apparatus of the character described, conveyor mechanism for transferring bulbs sealed and exhausted and adjusting a lead wire of each for reception in the center eyelet of a base, comprising a pair of sprocket wheels turnable about horizontal axes, a chain passing thereover and carrying sockets adapted to snugly receive the neck of a bulb of an exhausted and sealed lamp, a lead wire prepositioning device comprising a cam on a shaft beneath said conveyor and driven synchronously therewith, a lever operated by said cam, a wire carried by the free end of said lever and shaped for effecting a straightening operation, on said lead, preparatory to the removal of the bulb from which it depends for connection with a prefilled base.

4. Apparatus for conveying sealed and exhausted lamps having a plurality of lead wires and for positioning one of said lead wires of each lamp while enroute preparatory for reception of the positioned lead wire in the center eyelet of a base, comprising a conveyor adapted to receive said lamps and transport the latter through a plurality of work stations, a toothed blade disposed at one work station, a first means connected to said toothed blade and operable to move said blade between said lead wires to separate said lead wires and to cause said blade to engage said one lead wire to initially straighten the latter, a pair of jaws disposed at a second work station, a second means connected to said jaws and operable to reciprocate said jaws along said straightened lead wire, toggle means connected to said jaws and operable by movement of said jaws in one direction to cause closure of said jaws about said lead wire and further operable by movement of said jaws in the opposite direction to cause said jaws to open and means operatively associated with said first and second means for causing them to operate in timed relation to each other and the transporting movement of the conveyor.

5. Apparatus for conveying sealed and exhausted lamps having a plurality of lead wires and for positioning one of said lead wires of each lamp while enroute preparatory for reception of the positioned lead wire in the center eyelet of a base, comprising a conveyor adapted to receive said lamps and transport the latter through a plurality of work stations, a toothed blade disposed at one work station, a first means connected to said toothed blade and operable to move said blade between said lead wires to separate said lead wires and to engage said one lead wire to initially straighten the latter, guide means disposed in the path of movement of said straightened lead wire from said one station to a second work station to position said straightened lead wire in the central plane of said conveyor, a pair of jaws disposed at a third work station, a second means connected to said jaws and operable to reciprocate said jaws along said straightened lead wire, toggle means connected to said jaws and operable by movement of said jaws in one direction to cause closure of said jaws about said lead wire and further operable by movement of said jaws in the opposite direction to cause said jaws to open and means operatively associated with said first and second means for causing them to operate in timed relation to each other and the transporting movement of the conveyor.

6. Apparatus for conveying sealed and exhausted lamps having a plurality of lead wires and for positioning one of said lead wires of each lamp while enroute preparatory for reception of the positioned lead wire in the center eyelet of a base, comprising a conveyor adapted to receive said lamps and transport the latter through a plurality of work stations, a toothed blade disposed at one work station, a first means connected to said toothed blade and operable to move said blade between said lead wires to separate said lead wires and to engage said one lead wire to initially straighten the latter, a first positioning wire disposed in the path of movement of said initially straightened lead wire between successive later work stations to restrain and further straighten the latter, guide means disposed in the path of movement of said straightened lead wire at a second work station to position said straightened lead wire in the central plane of said conveyor, a pair of jaws disposed at a third work station, a second means connected to said jaws and operable to reciprocate said jaws along said straightened lead wire, toggle means connected to said jaws and operable by movement of said jaws in one direction to cause closure of said jaws about said lead wire and further operable by movement of said jaws in the opposite direction to cause said jaws to open and means operatively associated 45 with said first and second means for causing them to operate in timed relation to each other and the transporting movement of the conveyor.

7. Apparatus for conveying sealed and exhausted lamps having a plurality of lead wires and for positioning one of said lead wires of each lamp while enroute preparatory for reception of the positioned lead wire in the center eyelet of a base, comprising a conveyor adapted to receive said lamps and transport the latter through a plurality of work stations, a toothed blade disposed at one work station, a first means connected to said toothed blade and operable to move said blade between said lead wires to separate said lead wires and to engage said one lead wire to initially straighten the latter, a first positioning wire disposed in the path of movement of said initially straightened lead wire between successive later work stations to restrain and further straighten the latter, a second positioning wire disposed at a second work station, a second means connected to said second positioning wire and operable to wipe and further straighten the straightened lead wire, guide means disposed in the path of movement of said straightened lead wire from said second station to a third work station to position said straightened lead wire in the central plane of said conveyor, a pair of jaws disposed at a fourth work station, a third means connected to said jaws and operable to reciprocate said jaws along said straightened lead wire, toggle means connected to said jaws and operable by movement of said jaws in one direction to cause closure of said jaws about said lead wire and further operable by movement of said jaws in the opposite direction to cause said jaws to open and means operatively associated with said first means, second means, and third means for causing them to operate in timed relation to each other and the transporting movement of the conveyor.

8. In apparatus the character described, a conveyor mechanism for transferring sealed and exhausted lamps and adjusting a lead wire of each enroute for reception in the center eyelet of a base, comprising a chain conveyor carrying sockets, each of which is adapted to snugly receive the neck of an exhausted and sealed lamp and a lead wire prepositioning device comprising a cam on a shaft driven in synchronism with said conveyor, and jaws operated by said cam to reciprocate along said lead wire toward and away from a lamp, toggle means connected to said jaws and operable by movement of said jaws toward said lamp to cause closure of the latter about said lead wire, said toggle means being further operable by the straightening movement of said jaws along the gripped lead wire and away from the bulb to cause said jaws to open.

References Cited in the file of this patent

UNITED STATES PATENTS

| | | |
|---|---|---|
| 1,760,629 | Brindle | May 27, 1930 |
| 1,817,746 | Gooskens et al. | Aug. 4, 1931 |
| 2,120,877 | Uber | June 14, 1938 |
| 2,493,560 | Vaselli | Jan. 3, 1950 |
| 2,636,251 | Regelman | Apr. 28, 1953 |
| 2,650,634 | Young et al. | Sept. 1, 1953 |
| 2,652,931 | Hughes | Sept. 22, 1953 |
| 2,665,013 | Socke | Jan. 5, 1954 |
| 2,711,760 | Meckstroth et al. | June 28, 1955 |
| 2,721,584 | Midgley | Oct. 25, 1955 |